United States Patent [19]

Nakagawa et al.

[11] Patent Number: 5,258,226

[45] Date of Patent: Nov. 2, 1993

[54] SELF-EXTINGUISHING LAMINATED FILM

[75] Inventors: Yoshihiro Nakagawa, Shiga; Hitoshi Hori, Kyoto; Takayuki Kusu, Aichi; Yoshiaki Kodera, Shiga, all of Japan

[73] Assignee: Sekisui Chemical Co., Ltd., Osaka, Japan

[21] Appl. No.: 714,955

[22] Filed: Jun. 13, 1991

[30] Foreign Application Priority Data

Jun. 14, 1990 [JP] Japan .................... 2-156101

[51] Int. Cl.$^5$ ............... B32B 27/08; C08L 23/02
[52] U.S. Cl. .................... 428/339; 428/515; 428/516; 428/920; 428/921
[58] Field of Search .......... 428/515, 516, 920, 921, 428/339

[56] References Cited

U.S. PATENT DOCUMENTS 4,933,233  6/1990  Keough ............... 428/921 X
4,975,316 12/1990  Romanowski ........ 428/921 X

FOREIGN PATENT DOCUMENTS 300689  1/1989  European Pat. Off. .
326775  8/1989  European Pat. Off. .

OTHER PUBLICATIONS

Derwent Abstract, Database WPIL, Week 8414, May 02, 1984, London, GB; of JP-A-59 033 339, Feb. 23, 1984.

Primary Examiner—P. C. Sluby
Attorney, Agent, or Firm—Armstrong, Westerman, Hattori, McLeland & Naughton

[57] ABSTRACT

The invention provides a film composition comprising a thermoplastic polymer having a melt flow rate of 20 to 2000 (g/10 min), and a flame-retardant, and a self-extinguishing laminated film comprising at least two thermoplastic polymer films, at least one of the thermoplastic polymer films being a meltable film prepared from the composition.

10 Claims, No Drawings

# SELF-EXTINGUISHING LAMINATED FILM

FIELD OF THE INVENTION

The present invention relates to a self-extinguishing laminated film which, although combustible in flames, immediately ceases burning by itself when moved away from the fire source, causing no spread of fire, and which can be incinerated to a reduced amount of ash. The laminated film is suited as a material for decorating the interior of motor vehicles and for use in electric devices, buildings and packaging articles for transport and is useful as a covering film for preventing deposition of radioactive substances for use in places where radioactive substances are handled, for example, at work sites for repairing nuclear reactors.

DESCRIPTION OF THE PRIOR ART

Flame retardancy is required of synthetic resin films for use in the fields of electronic precision devices, transport apparatus, building materials, etc., and extensive research has heretofore been conducted to develop flame-retardant films. For example, a flame-retardant laminated film is proposed which comprises at least two plastic films, and an adhesive layer containing a flame retardant and interposed between those films (see Unexamined Japanese Patent Publication SHO 53-82887). However, the flame retardant, which is used in a large quantity, impairs the adhesion of the adhesive layer. Another flame-retardant laminated film is also proposed which is adapted to preclude the impairment of adhesion and which comprises two plastic films and an adhesive layer having a thickness of 20 to 100% of the combined thickness of the films. The adhesive layer comprises an adhesive, and a particulate flame retardant insoluble in the adhesive, added thereto in an amount of 60 to 400 parts by weight per 100 parts by weight of the adhesive and having a mean particle size up to 80% of the thickness of the adhesive layer (see Unexamined Japanese Patent Publication SHO 62-240545).

These flame-retardant laminated films nevertheless have problems. They require the presence of a large amount of flame retardant to impart flame retardancy to the film, whereas the flame retardant, which consists primarily of a halogen, phosphorus, sulfur, antimony or like element, releases a harmful gas when the film is incinerated to cause air pollution while giving rise to the corrosion of the incinerator and water pollution.

Further to prevent the occurrence of such a harmful gas due to incineration, resin compositions for use in flame-retardant films are proposed which are free from any chlorine-containing additive and which comprise, for example, a combustible polymer of the non-chlorine type, and an organopolysiloxane and an organometallic compound admixed therewith (Examined Japanese Patent Publication SHO 63-65710).

However, the flame-retardant film prepared from the composition leaves a large amount of ashes due to the presence of the organopolysiloxane, organo-metallic compound, etc. when incinerated although combustible without releasing a harmful gas.

In places where radioactive substances are handled, for example, in nuclear power plants and radioactive substance laboratories, synthetic resin films are used for covering the floors, walls, ceilings, partitions and the like for preventing the adhesion of the radioactive substance. When used for a specified period of time, the film is removed and incinerated for replacement by a new one. Even if the film is incinerated, the resulting ash remains radioactive. The larger the amount of ash, the greater are the equipment and the cost required for treating the ash. More specifically, containers of increased capacity must be used for enclosing and sealing off the radio-active ash in one way or another, necessitating a greater material cost for the enclosure and a place of greater area for storing the enclosed ash. It is therefore required that the covering film for use in such places where the radioactive substance is handled should be combustible to a reduced amount of ashes.

SUMMARY OF THE INVENTION

A first object of the present invention is to provide a laminated film having excellent self-extinguishing properties.

A second object of the present invention is to provide a laminated film which can be incinerated to a diminished quantity of ashes almost without releasing any harmful gas of halogen compound or the like or only with a greatly reduced amount of such a gas if any.

The present invention provides a self-extinguishing laminated film comprising at least two thermoplastic polymer films, at least one of the thermoplastic polymer films comprising a thermoplastic polymer having a melt flow rate in the range of 20 to 2000 (g/10 min), and a flame retardant.

Thus, the self-extinguishing laminated film of the present invention comprises two or more films, at least one of which contains a small amount of flame retardant and is prepared from a specific thermoplastic polymer which is very easily meltable by heat because the polymer has the specified melt flow rate. (The polymer film will hereinafter be referred to as the "meltable film"). Even if the laminated film is exposed to fire, the meltable film immediately falls upon melting, reducing the likelihood of spread of fire to the remaining film portion. Further since the melted fallen polymer itself has self-extinguishing properties, fire will not spread eventually.

The present invention further provides a composition for forming a meltable film which composition comprises a thermoplastic polymer having a melt flow rate in the range of 20 to 2000 (g/10 min), and a flame retardant.

DETAILED DESCRIPTION OF THE INVENTION

Preferable to use as the thermoplastic polymer for forming the meltable film is a polyolefin or polyamide resin. Examples of useful polyolefin resins are polyethylene, ethylene-vinyl acetate copolymer, ethylene-ethyl acrylate copolymer and like ethylene copolymers, polypropylene, copolymer of propylene and other monomer, low-molecular-weight polyethylene, low-molecular-weight polypropylene and the like.

Examples of useful polyamide resins are nylon 6, nylon 6,6, nylon 6,10, nylon 11, nylon 12, copolymers of such nylons, etc. These resins may contain a higher alcohol, hydroxybenzoic acid ester or like plasticizer.

The thermoplastic polymers useful for forming the meltable film are not limited only to these polyolefin resins and polyamide resins. Also usable are polystyrene, methyl polymethacrylate and like thermoplastic synthetic resins, styrene-butadiene-styrene copolymer, styrene-isoprene-styrene copolymer, styrene-ethylene-isoprene-styrene block copolymer, styrene-ethylenebutylene-styrene block copolymer, polyurethane rubber, polyester rubber, styrene-butadiene rubber, nitrile rubber, polybutadiene, polyisobutylene, polyisoprene and like synthetic rubbers.

A softener may be added to the thermoplastic polymer to lower the melt viscosity of the meltable film in the range of combustion temperatures and to permit the film to exhibit an enhanced flame-retardant effect. The addition of the softener lowers the melt viscosity of the thermoplastic polymer, further making it possible to adjust the film forming temperature to a level lower than the melting point of the flame retardant.

Examples of such softeners are dioctyl phthalate, dibutyl phthalate, dioctyl sebacate and like plasticizers, fluid paraffin, polybutadiene, polyisoprene, polyisobutylene, polybutene and like liquid high polymers, coumarone-indene resin, petroleum resins of low melting, point, etc. It is suitable that the softener be used in an amount of 20 to 70 wt. % based on the thermoplastic polymer.

When required, a filler, pigment, antioxidant, ultraviolet absorber, etc. may be added to the thermoplastic polymer.

The thermoplastic polymer or the mixture thereof with the softener for forming the meltable film for use in the present invention is limited to the range of 20 to 2000 (g/10 min) in melt flow rate. The polymer, which is relatively higher in molecular weight, will encounter difficulty in falling on melting when having a melt flow rate of less than 20. Even if falling on melting, the polymer is then likely to permit fire to spread to the other component film of the laminate before falling, failing to perform the desired function. Conversely, if the melt flow rate exceeds 2000, the polymer film becomes sticky or brittle at room temperature. The melt flow rate is more preferably in the range of 50 to 1500.

The term "melt flow rate" as used herein refers to a value measured according to JIS K7210, "Flow Test Methods for Thermoplastic Resins." The value is obtained under Condition 4 (test temperature 190° C., test load 2.16 kgf) for polyethylene resins, or under Condition 14 (test temperature 230° C., test load 2.16 kgf) for polypropylene resins and polyamide resins.

The flame retardant will be described next.

The flame retardant to be incorporated in the meltable film is an agent which imparts self-extinguishing properties to molten drops of the molten drops of the film during combustion. Accordingly, the amount of flame retardant to be incorporated can be much smaller than is usually used for rendering films flame-retardant, and it is possible to use organic or inorganic flame retardants which are free from halogens, phosphorus, antimony or the like and which are generally low in flame retardant effect.

Especially suitable to use as the flame retardant is urea. Urea produces ammonia on decomposition during combustion, is lesser in the amount of heat of combustion and therefore gives self-extinguishing properties to the film containing urea.

Urea melts at 132° C., and when further heated, the particles of urea coagulate and become susceptible to decomposition, so that the forming temperature of the urea-containing composition is preferably lower than 132° C. Urea is usable in any form, e.g., powdery or crystalline, while powdery urea is smoothly dispersible in the composition and is therefore desirable. Since urea has strong polarity and is low in compatibility with the thermoplastic polymer, powdery urea is desirable to use which is preferably up to 50 μ, more preferably up to 20 μ, in particle size so as to be effectively dispersible in an increased amount in the thermoplastic polymer. Powdery urea becomes more liable to deliquesce if the particle size is smaller, rendering the composition of the invention more susceptible to blocking. It is therefore desirable to add several percent of an auxiliary agent, such as stearic acid, to prevent blocking.

Urea can be used in combination with a flame retardant consisting primarily of a halogen compound such as chlorinated paraffin, chlorinated polyethylene or bromine compound. In this case, the flame retardant of the halogen type is used preferably in such an amount as to permit occurrence of only a very small amount of harmful gas.

When the laminated film wherein urea is used as the flame retardant is incinerated after use, the urea exhibits a flame retardant effect, but if held in strong fire within the incinerator, the urea decomposes completely with the progress of combustion, leaving little or no ash, or only a very small amount of ash if any. Accordingly, the laminated film is especially suited for use in places where radioactive substances are handled for covering the surfaces of floors, walls, ceilings, etc., and is useful also for partitions, dust removing mats for shoes, packaging materials, containers, etc. Even if the film is then inadvertently ignited, the self-extinguishing properties of the film prevent spread of fire. Further the film can be incinerated after use without producing a halogen gas or like noxious gas, while the ash, even if containing a radioactive substance, is very small in amount and can be treated easily.

Flame retardants of the urea type which can be used include, besides urea to be used singly, biuret, cyanuric acid, ammelide and triuret which are obtained by removing ammonia from urea by heating.

Other flame retardants usable are polyvalent lower fatty acids or ammonium salts thereof such as malonic acid, succinic acid, tartaric acid, malic acid, glutaric acid, citric acid, adipic acid and ammonium salts of these acids; dicarboxylic acids, ammonium compounds or derivatives thereof such as oxalic acid, oxalic acid monoammonium, oxalic acid diammonium, oxamic acid, ammonium oxamate, oxamide and oxalic acid dihydrazide; carbonic acid salts of guanidine, aminoguanidine, guanylurea, guanylguanidine and like guanidino compounds; guanidinoacetic acid and ureidoacetic acid.

These flame retardants release no halogen-containing gas and leave little or no ash when the laminated film is incinerated. However, since urea and other flame retardants are hygroscopic or soluble in water, it is desirable to laminate a water-resistant film to each surface of the meltable film incorporating the flame retardant.

The flame retardant selected from the group consisting of the above-mentioned flame retardants of the urea type; polyvalent lower fatty acids and ammonium salts thereof; dicarboxylic acids, ammonium compounds thereof and derivatives thereof; carbonic acid salts of guanidino compounds; guanidinoacetic acid and ureidoacetic acid is used preferably in an amount of 1 to 100 parts by weight per 100 parts by weight of the thermoplastic polymer. If the amount is less than 1 part by weight, a low flame-retardant effect will result, whereas if the amount is over 100 parts by weight, the thermoplastic polymer or the mixture of thermoplastic polymer and softener will have markedly impaired strength. It is then likely that the film formed will not retain the shape. More preferably, the flame retardant is used in an amount of 10 to 40 parts by weight.

Also usable are other flame retardants including common organic flame retardants containing a halogen, phosphorus or sulfur, and inorganic flame retardants such as metal hydroxides and sodium bicarbonate. These retardants are used preferably in an amount of 1 to 20 parts by weight per 100 parts by weight of the thermoplastic polymer to achieve a satisfactory result.

Preferably, the meltable film occupies at least 30% of the entire laminated film in weight ratio. If the ratio is less than 30%, the desired flame-retardant effect will not always be available. More preferably, the weight ratio is at least 50%.

Suitable resins for forming the component film or films other than the meltable film are polyethylene, ethylene-vinyl acetate copolymer, polypropylene, polyethylene terephthalate and like polyesters, polyamide, etc. It is preferable to use a resin of the same type as the meltable film.

Generally, films made of a resin having a high melt index, i.e., good melt-flow properties, are low in mechanical strength, so that it is desirable to laminate a film of common general-purpose resin to the meltable film to provide a laminated film having good strength properties and flame retardancy. It is also desirable to reinforce the laminated film by laminating a reinforcing layer of fiber, fabric, nonwoven fabric or the like to at least one surface of the meltable film.

The meltable film is formed by a usual method, for example, by hot-pressing the material therefor, or extruding the material with a T-die.

The meltable film to be included in the self-extinguishing laminated film of the present invention may be laminated to one or both surfaces of other film, or may alternatively be interposed between two thermoplastic resin films.

The meltable film is laminated to other film, for example, by interposing the meltable film between sheets of other film, and hot-pressing or hot-laminating the assembly or pressure-bonding the assembly with pressure rollers; coating the meltable film with the material for forming the other film; applying the material for forming the meltable film to the other film by extrusion coating, melt coating or solution coating; co-extrusion or like usual method. Other methods are also usable.

In the case where the self-extinguishing laminated film of the present invention becomes inadvertently iginited, the meltable film falls dropwise on melting before the fire spreads, and upon the laminated film leaving the fire source, the film immediately ceases burning owing to the flame retardant incorporated therein, thus exhibiting a self-extinguishing effect in the initial stage of combustion (on ignition). The laminated film is thereafter well-suited as a material for decorating the interior of motor vehicles and for use in electric devices, buildings and packaging articles for transport, further ensuring enhanced safety, for example, in repairing nuclear reactors.

EXAMPLES

The present invention will be described in greater detail with reference to examples and comparative examples and to the results achieved by testing the laminated films obtained for properties.

EXAMPLE 1

Ninety-five parts by weight of ethylenevinyl acetate copolymer (brand name: "ULTRATHENE 720," product of TOSOH Co., Ltd., 150 in melt flow rate, 28% in vinyl acetate content) and 5 parts by weight of bromine-type flame retardant (brand name: "AFT 1002," product of Asahi Glass Co., Ltd., 66% in bromine content) were kneaded together with hot rolls at 120° C. for 5 minutes to prepare a material for forming a meltable film. The material was then sandwiched between two films of a linear-chain low density polyethylene having a thickness of 20 $\mu$m, and the assembly was hot-pressed at 120° C. by a press with a 200-$\mu$m-thick spacer inserted therein to obtain a laminated film having a thickness of 200 $\mu$m.

EXAMPLE 2

A laminated film having a thickness of 200 $\mu$m was prepared in the same manner as in Example 1 with the exception of using a different ethylene-vinyl acetate copolymer (brand name:"ULTRATHENE 530," product of TOSOH Co.. Ltd., 75 in melt flow rate, 6% in vinyl acetate content).

COMPARATIVE EXAMPLE 1

A laminated film having a thickness of 200 $\mu$m was prepared in the same manner as in Example 1 with the exception of using a different ethylene-vinyl acetate copolymer (brand name: "ULTRATHENE 541," product of TOSOH Co., Ltd., 9 in melt flow rate, 10% in vinyl acetate content).

COMPARATIVE EXAMPLE 2

A laminated film having a thickness of 200 $\mu$m was prepared in the same manner as in Example 1 with the exception of using a different ethylene-vinyl acetate copolymer (brand name:"ULTRATHENE 631," product of TOSOH Co., Ltd., 1.5 in melt flow rate, 20% in vinyl acetate content).

EXAMPLE 3

Seventy parts by weight of low-molecular-weight polypropylene (brand name:"VISCOLE 330-P," product of Sanyo Kasei Kogyo Co., Ltd., at least 500 in melt flow rate), 30 parts by weight of ethylene-vinyl acetate copolymer (brand name: "ULTRATHENE 720," product of TOSOH Co., Ltd., 150 in melt flow rate, 28% in vinyl acetate content) and 10 parts by weight of phosphoric acid guinidine (brand name: "APINONE 301, " product of sanwa Chemical Co., Ltd.) were mixed together with heating at 160° C. The mixture was then applied by a hotmelt coater to one surface of a polypropylene film having a thickness of 30 $\mu$m to form a meltable film, 100 $\mu$m in thickness, and obtain a laminated film having a thickness of 130 $\mu$m.

EXAMPLE 4

With 45 parts by weight of ethylene-vinyl acetate copolymer (brand name: "ULTRATHENE 681," product of TOSOH Co., Ltd., 350 in melt flow rate, 20% in vinyl acetate content) were mixed 5 parts by weight of chlorinated polyethylene (brand name: "ELASTRENE 301-A," product of Showa Denko K.K.) and 50 parts by weight of toluene. The mixture was then applied by a roll coater to one surface of a polyethylene terephthalate film having a thickness of 15 $\mu$m to form a meltable film having a thickness of 200 $\mu$m. A low-density polyethylene film having a thickness of 20 μm was joined to the upper surface of the meltable film by pressing with heated rolls to obtain a laminated film having a thickness of 235 μm.

EXAMPLES 5-10, COMPARATIVE EXAMPLE 3

A 680 g quantity of styrene-ethylene-butylene-styrene copolymer and 120 g of polybutene were kneaded together with a twin roll at 110° C. for 5 minutes. The resulting mixture was 95 in melt flow rate. To a 300-g portion of the mixture was added 90 g of powdery urea, and the mixture was kneaded with a twin roll at 110° C. for 5 minutes. The mixture was then sandwiched between two stainless steel panels, pressed by a hot press at 110° C. for 5 minutes and thereafter cooled to obtain a meltable film B having a thickness of 70 μm.

Several kinds of combustible synthetic resin films A were separately prepared as listed in Table 1 and laminated to the film B to obtain laminated films.

COMPARATIVE EXAMPLE 4

A mixture of ethylene-vinyl acetate copolymer (1.5 in melt flow rate, 20 wt. % in vinyl acetate content) and crystalline urea in equal amounts by weight was spread over a polyethylene terephthalate film with a thickness of 12 μm in an amount of 100 g/m², and the film was then held in an air oven at 120° C. for 1 minute, whereupon a polyethylene film having a thickness of 20 μm was pressed against the film from above to prepare a laminated film.

EXAMPLE 11

With 100 parts by weight of ethylene-vinyl acetate copolymer (250 in melt flow rate, 20 wt. % in vinyl acetate content) was admixed 10 parts by weight of crystalline urea, and the mixture was molded into pellets at a die temperature of 100° C. The pelletized mixture was then extruded by a T-die to form a meltable film having a thickness of 120 μm. A polyethylene terephthalate film, 12 μm in thickness, was affixed to each surface of the meltable film immediately thereafter to prepare a laminated film.

EXAMPLE 12

With 100 parts by weight of powdery ethylenevinyl acetate copolymer (160 in melt flow rate, 20% by weight in vinyl acetate content) were admixed 20 parts by weight of crystals of ammonium citrate, and the mixture was applied over the surface of a 12-μm-thick polyester film in an amount of 200 g/m². The film was then passed through a hot air oven at 130° C. to melt the copolymer and form a meltable film on the polyester film. Immediately thereafter, a low-density polyethylene film with a thickness of 25 μm was bonded under pressure to the upper surface of the meltable film by pressure rolls to obtain a laminated film.

COMPARATIVE EXAMPLE 5

A laminated film was prepared in the same manner as in Example 12 with the exception of not using the crystalline ammonium citrate.

COMPARATIVE EXAMPLE 6

A laminated film having a thickness of 200 μm was prepared by repeating the same procedure as in Example 1 using 70 parts by weight of the same ethylene-vinyl acetate copolymer as used in Comparative Example 2 and 30 parts by weight of aluminum hydroxide available as a reagent.

EXAMPLES 13-15

Laminated films were prepared in the same manner as in Example 12 with the exception of using 20 parts by weight of oxalic acid monoammonium (Example 13), guanidine carbonate (Example 4) or guanidinoacetic acid (Example 15) as a flame retardant.

EXAMPLE 16

A composite film was prepared by laminating a polyethylene film to one surface of the meltable film formed in Example 1, spun rayon muslin woven of yarns weighing 15 g/m² at an opening spacing of 3 mm to the other surface of the film, and a polyethylene film to the outer surface of the muslin (PE film/meltable film/muslin/PE film). The polyethylene film over the muslin was firmly bonded to the meltable film through the openings of the muslin.

EXAMPLE 17

A nonwoven fabric weighing 15 g/m² and prepared from heatsealable fiber (brand name: "NBS-E," product of Daiwa Spinning Co., Ltd.) was coated with polyethylene resin to a thickness of 25 μm by extrusion. The fabric side of the resulting composite sheet was fitted over one surface of the meltable film formed in Example 11, and a polyethylene film was fitted over the other surface of the meltable film. The sheet and the films were joined together by heat lamination (PE film/ nonwoven fabric/meltable film/PE film).

EXAMPLE 18

Melted hotmelt yarns were sprayed perpendicularly to cotton yarns arranged in parallel in one direction at a spacing of 5 mm to form a sheet resembling a cloth. The sheet was placed on one surface of the meltable film formed in Example 11. A polyethylene film was fitted over each surface of the resulting material and laminated by heating to make the multilayer film (PE film/cloth of parallel yarns/meltable film/PE film). The composite film obtained was thus reinforced with the parallel yarns in only one direction.

EXAMPLE 19

A glass fiber cloth (made of yarns fixed to one another with a hotmelt adhesive) having 5-mm openings and weighing 50 g/m² was fitted over the meltable film formed in Example 11, and a polyethylene film was laminated to each surface of the resulting material by heating to make the multilayer film (PE film/glass fiber cloth/meltable film/PE film). The composite film obtained was given enhanced strength in two directions. When indicated, the composite film reduced only to the glass fiber yarns.

Property Test

The laminated films obtained in Examples and Comparative Examples were tested for self-extinguishing properties and checked for ash content. The self-extinguishing properties were determined by preparing a test piece in the form of a 20-mm-wide strip from the laminated film, setting fire to the test piece as held in suspension vertically and checking whether the test piece ceased burning immediately when fire source was moved away from the test piece.

The laminated films of Examples all exhibited excellent self-extinguishing properties and were very small in ash content. In contrast, the laminated films of Comparative Examples continued burning to the last despite dropwise falling after ignition. After completely burning, the film of Comparative Example 6 left a large amount of ash.

TABLE 1

| Item | Example | | | | | | Comp. Ex. |
|---|---|---|---|---|---|---|---|
| | No. 5 | No. 6 | No. 7 | No. 8 | No. 9 | No. 10 | No. 3 |
| Film A | PE | PE | PE | PET | PET | ONY | PE |
| Thickness (μm) | 30 | 20 | 30 | 20 | 20 | 20 | 90 |
| Laminate structure | A/B/A | A/B/A | A/B | A/B/A | A/B | A/B/A | A/B/A |
| B/(A + B) wt. ratio % | 56 | 65 | 72 | 57 | 72 | 61 | 28 |

Note
PE: polyethylene
PET: polyethylene terephthalate
ONY: oriented nylon

What is claimed is:

1. A self-extinguishing laminated film comprising at least two thermoplastic polymer films, at least one of the thermoplastic polymer films containing a flame retardant and having a melt flow rate in the range of 20 to 2,000 grams/10 minutes (grams/10 minutes), said flame retardant being selected from the group consisting of urea-type flame retardants, organic flame retardants containing a halogen, phosphorous or sulphur, polyvalent lower fatty acids and ammonium salts thereof, dicarboxylic acids and ammonium compounds thereof and derivatives thereof, carbonic acid salts of guanidino compounds, guanidino-acetic acid and ureidoacetic acid.

2. A self-extinguishing laminated film as defined in claim 1, wherein said thermoplastic polymer film containing a flame retardant comprises at least 30% by weight of the laminated film.

3. A self-extinguishing laminated film as defined in claim 1, wherein the thermoplastic polymer film containing the flame retardant comprises at least 50 percent by weight of the laminated film.

4. A self-extinguishing laminated film as defined in claim 1 wherein a reinforcing layer is laminated to at least one surface of the thermoplastic polymer film containing a flame retardant.

5. The self-extinguishing laminated film as defined in claim 1, wherein the melt flow rate of the polymer is in the range of 50 to 1,500 g/10 min. (g/10 min.).

6. The self-extinguishing laminated film as defined in claim 1, wherein the urea-type flame retardants are selected from the group consisting of urea, biuret, cyanuric acid, ammelide and triuret; the polyvalent lower fatty acids are selected from the group consisting of malonic acid, succinic acid, tartaric acid, malic acid, glutaric acid, citric acid and adipic acid; the dicarboxylic acids are selected from the group consisting of oxalic acid, oxalic acid monoammonium, oxalic acid diammonium and oxamic acid; and the guanidino compounds are selected from the group consisting of guanidine, amino-guanidine, guanylurea and guanylguanidine.

7. The self-extinguishing laminated film as defined in claim 1, wherein the flame retardant comprises 1-100 parts by weight per 100 parts by weight of the thermoplastic polymer film containing the flame retardant, and wherein the flame retardant is selected from the group consisting of urea-type flame retardants; polyvalent lower fatty acids and ammonium salts thereof; dicarboxylic acids, ammonium compounds thereof and derivatives thereof; carbonic acid salts of guanidino compounds; guinidinoacetic acid and ureidoacetic acid.

8. The self-extinguishing laminated film as defined in claim 7, which comprises 10-40 parts by weight of the flame retardant per 100 parts by weight of the thermoplastic polymer.

9. The self-extinguishing laminated film as defined in claim 1, wherein the flame retardant comprises 1-20 parts by weight per 100 parts by weight of the thermoplastic polymer containing the flame retardant, and wherein the flame retardant is selected from the group consisting of: organic flame retardants containing a halogen, phosphorus or sulphur; metal hydroxides; and sodium bicarbonate.

10. The self-extinguishing laminated film as defined in claim 1, wherein the thermoplastic polymer which forms the films contains a softener.

* * * * *